Patented Feb. 19, 1946

2,395,379

UNITED STATES PATENT OFFICE 2,395,379

LUBRICANT FOR LOW TEMPERATURES

John D. Morgan, South Orange, N. J., assignor to Cities Service Oil Company, New York, N. Y., a corporation of Pennsylvania No Drawing. Application September 24, 1942, Serial No. 459,519

7 Claims. (Cl. 252—52)

This invention relates to improvements in the method of lubricating metallic bearing surfaces of various types of mechanisms such as those which are used at excessively low temperatures or over relatively wide temperature ranges including low temperatures.

More particularly the invention includes an improved lubricant consisting essentially of a single liquid compound adapted to be effective in the lubrication of various bearing surfaces at temperatures of for example about 100° F. below freezing temperature and also at high temperatures of the order of 100° or 200° F. The lubricating oils commonly available do not provide effective lubrication at such low temperatures or over such wide temperature ranges unless they are diluted with large quantities of light hydrocarbons or otherwise substantially changed.

Many types of mechanisms require lubricants of the low temperature type of the present invention since they are subject to operation at widely different temperatures within a very short period of time. For example, an aeroplane may take off at a ground temperature of 100° or 150° F. and within a matter of minutes be operating at temperatures far below freezing, such as minus 40° F. or minus 60° F. Other equipment must be used almost exclusively at low temperatures as for example motor vehicles which are used in the Arctics. In many cases it is not possible to operate certain mechanisms in a frigid climate or under conditions of extreme cold until the bearings thereof have been warmed artificially.

With the foregoing requirements and difficulties in mind in connection with the lubrication of certain types of mechanisms the primary object of the present invention is to provide a method for lubricating the metal bearing surfaces of such mechanisms and to provide a lubricant which will avoid the above-mentioned difficulties and satisfy the need for a low temperature lubricant.

The present invention includes the discovery that benzaldehyde has the unique properties required for the lubrication of metal bearing surfaces over wide temperature ranges of the type referred to, and that it is an effective lubricant at extremely low temperatures. These properties of benzaldehyde are important and unusual because it would not normally be expected that a material which would be a satisfactory lubricant at a temperature of about minus 70° F. would also be satisfactory and have a proper viscosity when used at temperatures of the order of 100° F. or 200° F. Benzaldehyde is a colorless oil of high gravity which has a load-carrying capacity greater than that of some mineral lubricating oils. For example, a light spindle oil produced an incipient seizure on a 4-ball testing machine at a gage load of 250 lbs., whereas benzaldehyde did not produce such a seizure until the gage showed 450 lbs. Benzaldehyde has the following properties:

| | | |
|---|---|---|
| Viscosity at minus 40° F | centistokes | 7.66 |
| Viscosity at 0° F | do | 3.51 |
| Viscosity at 100° F | do | 1.13 |
| Viscosity at 200° F | do | 0.68 |
| Melting point | minus °F | 14.8 |
| Freezes at | do | 68.8 |
| Boiling point | °F | 354 |
| Specific gravity | | 1.0504 |
| Index of refraction | | 1.54629 |

The improved lubricant, benzaldehyde, may be applied directly to the bearing surfaces to be lubricated in any suitable manner commonly used for the application of liquid lubricants. The benzaldehyde lubricant is preferably used undiluted and unmixed with other materials but if used on bearings which may develop rather high pressures it should be protected with a small proportion of an extreme pressure agent, from 1% to about 3%. Benzaldehyde containing 1% of dissolved "Polane" as an extreme pressure agent was found to be useful on the 4-ball testing machine up to a gage load of about 1000 lbs. Other extreme pressure agents may be employed instead of "Polane." For example, it was found that benzaldehyde containing 1% of dissolved sulfurized cresyl phosphite carried a load of 750 lbs. gage on the 4-ball testing machine referred to above. Any of the extreme pressure agents may be used in place of the ones mentioned above, as for example sulfurized or sulfurized and chlorinated lard oil, sperm oil, or vegetable oil may be used. Various organic esters of phosphorous, phosphoric and thiophosphoric acids are known to be suitable extreme pressure agents and may also be used. Tricresyl phosphate is an example.

The lubricant of the present invention either when consisting essentially of benzaldehyde or when it includes an extreme pressure agent may also include an antioxidant or an anti-corrosion agent or both, to the extent of from 0.1% to 2%. For example, tricresyl phosphite, triethanolamine, organic tin compounds, chromium and lead oleates and others may be used. In some cases an antioxidant will also act as an anticorrosion agent or corrosion inhibitor.

Benzaldehyde is only sparingly soluble in water and therefore need not be unusually protected against water in applying or using it as a lubricant. It is however converted by some reducing agents under proper conditions, usually elevated temperatures to benzyl alcohol. Strong reducing agents should therefore in general not be used as antioxidants although the conversion of a few percent of the benzaldehyde to benzyl alcohol will be no disadvantage to the lubricating properties of the benzaldehyde. Benzyl alcohol itself is a high gravity colorless oil of pleasant odor which would actually improve the odor of the benzaldehyde lubricant. Benzyl alcohol is only slightly soluble in water, melts at a very low temperature and has a boiling point of about 400° F. Its density is 1.050 and its index of refraction 1.53955.

In the use of benzaldehyde as a lubricant it was discovered that the load-carrying capacity of a mineral lubricating oil could be greatly increased by the use of a few percent of benzaldehyde. For example, it was found that a light petroleum spindle oil containing 3.2% benzaldehyde did not give an incipient seizure on the 4-ball testing machine until the gage showed a load of 600 lbs. This is to be compared with the load carried by the spindle oil alone of 250 lbs. gage under the same conditions. The proportion of benzaldehyde used in liquid mineral lubricating oils may vary from 2% to 8%.

While the features of the present invention have been described and illustrated in connection with certain examples, it is to be understood that the invention is not to be restricted except in accordance with the scope of the prior art and of the appended claims.

Having described the invention in its preferred form, what is claimed as new is:

1. The method of lubricating relatively moving metallic bearing surfaces over temperature ranges of approximately 270° F. extending to temperatures as low as approximately minus 68° F., these ranges being such that an ordinary lubricating oil is unable to provide effective lubrication, which comprises maintaining on such bearing surfaces a lubricant consisting essentially of benzaldehyde.

2. The method as defined by claim 1 in which said lubricant includes an extreme pressure agent.

3. A lubricant having viscosity characteristics adapting it for effective lubrication at extremely low subzero temperatures consisting essentially of benzaldehyde containing a small proportion of an extreme pressure agent and a small proportion of an antioxidant.

4. The method of lubricating metallic bearings of mechanisms operated at subzero temperatures ranging down to −68° F. comprising applying to the bearings of such mechanisms a fluid lubricant consisting essentially of benzaldehyde containing a small proportion of an antioxidant adapted to protect the lubricant against oxidation.

5. The method as defined by claim 4 in which the fluid lubricant contains a small proportion of an extreme pressure agent adapted to substantially increase the load-carrying capacity of the lubricant.

6. In the lubrication of metallic bearing surfaces operated over wide temperature ranges of from approximately minus 68° F. to upwards of 100° F., the improvement which comprises applying to the bearings of such mechanisms a lubricant consisting essentially of benzaldehyde.

7. A lubricant for metallic bearing surfaces having viscosity characteristics adapted to provide effective lubrication at extremely low temperatures, consisting essentially of benzaldehyde having dissolved therein a small proportion of an extreme pressure agent sufficient to substantially increase the load-carrying capacity of the benzaldehyde.

JOHN D. MORGAN.